United States Patent [19]

Staas, Jr. et al.

[11] Patent Number: 5,125,091

[45] Date of Patent: Jun. 23, 1992

[54] OBJECT ORIENTED CONTROL OF REAL-TIME PROCESSING

[75] Inventors: Philip C. Staas, Jr., Phoenixville; Rob Knee, Lansdale; Roy Schilling, Norristown; Robert E. Murray, Malvern, all of Pa.

[73] Assignee: Hazox Corporation, Chadds Ford, Pa.

[21] Appl. No.: 363,068

[22] Filed: Jun. 8, 1989

[51] Int. Cl.[5] .................................................. G06F 9/00
[52] U.S. Cl. ............................ 395/650; 364/242.4; 364/949.3; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 3,611,300 | 10/1971 | Aldrich et al. | 364/200 |
| 4,325,120 | 4/1982 | Colley et al. | 364/200 |
| 4,383,298 | 5/1983 | Huff et al. | 364/300 |
| 4,459,663 | 7/1984 | Dye | 364/200 |
| 4,509,123 | 4/1985 | Vereen | 364/300 |
| 4,563,739 | 1/1986 | Gerpheide et al. | 364/403 |
| 4,635,208 | 1/1987 | Coleby et al. | 364/491 |
| 4,723,209 | 2/1988 | Hernandez et al. | 364/300 |
| 4,723,210 | 2/1988 | Barker et al. | 364/300 |
| 4,723,211 | 2/1988 | Barker et al. | 364/300 |
| 4,739,477 | 4/1988 | Barker et al. | 364/300 |
| 4,749,985 | 6/1988 | Corsberg | 340/517 |
| 4,791,550 | 12/1988 | Stevenson et al. | 364/200 |
| 4,812,819 | 3/1989 | Corsberg | 340/517 |
| 4,814,971 | 3/1989 | Thatte | 364/200 |
| 4,816,994 | 3/1989 | Freiling et al. | 364/200 |
| 4,821,220 | 4/1989 | Duisberg | 364/578 |
| 4,823,257 | 4/1989 | Tomomura | 364/200 |
| 4,827,404 | 5/1989 | Barstow et al. | 364/200 |

OTHER PUBLICATIONS

Fishman, D. H., "An Overview of the IRIS Object Oriented DBMS", COMPCON Spring [88, Digest of Papers, pp. 177-180.

Mannai et al., "Design and Implementation of a Distributed Transaction Processing System", COMPCON Spring '88, Digest of Papers, pp. 185-188.

Parsaye et al., *Intelligent Databases*, Chapter 3, pp. 97-159 and Bibliography, pp. 449-468.

*Primary Examiner*—Michael R. Fleming
*Assistant Examiner*—Debra A. Chun
*Attorney, Agent, or Firm*—Panitch Schwarze Jacobs & Nadel

[57] ABSTRACT

A method of controlling processing in a computer, particularly real-time processing, is performed using computer data objects. Real-time or other input data received from data sources is classified according to pre-stored control data. The control data defines which data source provides the real-time data, how the real-time data is to be processed, where the real-time data is to be stored and what reports the real-time data will be used in. The classified real-time data becomes a computer data object with its associated control data and all subsequent processing is performed on the computer data object.

10 Claims, 6 Drawing Sheets

| | Transaction Level (Level 1) | | Record Level (Level 2) | | Field Level (Level 3) | |
|---|---|---|---|---|---|---|
| Make a Transaction | Unconditionally | | Create a New Record | Unconditionally | Change a Field Value | Same as in Create a New Record |
| | Validate on one or more Fields using Validation Files | | | Previous Field Exists | | |
| | | | | Previous Field Doesn't Exist | | |
| | | | | Old Value / New Value | Constant or Field Value | |
| Deny a Transaction | Invalid Field Data | | | | | |
| Transaction Reset ("TR") | Unconditionally Restarts Station | | Modify a Previous Record | Unconditionally if <u>Previous Record Exists</u> | Don't change a Field Value | Same as in Create a New Record |
| Transaction Terminate ("TT") | Send to Record Level Processing | | Discard Transaction | Write with an Alarm Flag | | |
| | | | | Don't Write | | |

Fig. 4A

| Transaction Level (Level 1) | | Record Level (Level 2) | | | | Field Level (Level 3) | |
|---|---|---|---|---|---|---|---|
| Make a Transaction | Unconditionally | Create a New Record | Unconditionally | | | Change a Field Value | Same as in Create a New Record |
| | Validate on one or more Fields using Validation Files | | Previous Field Exists | | | | |
| | | | Previous Field Doesn't Exist | Old Value | Constant or Field Value | Don't change a Field Value | Same as in Create a New Record |
| | | | | New Value | | | |
| Deny a Transaction | Invalid Field Data | Modify a Previous Record | Unconditionally if Previous Record Exists | | | | |
| Transaction Reset ("TR") | Unconditionally Restarts Station | Discard Trans- action | Write with an Alarm Flag | | | | |
| Transaction Terminate ("TT") | Send to Record Level Processing | | Don't Write | | | | |

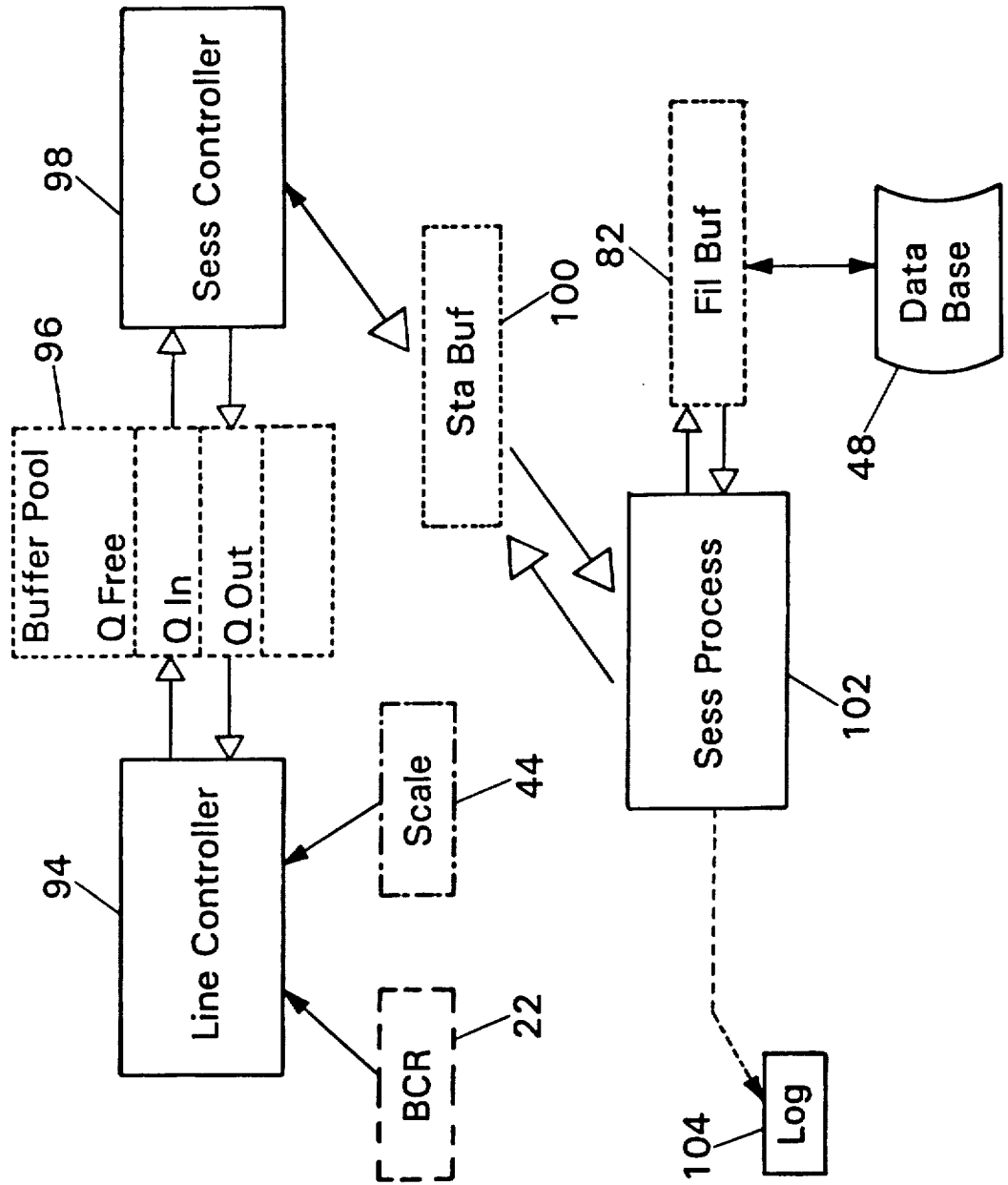

OBJECT ORIENTED CONTROL OF REAL-TIME PROCESSING

BACKGROUND OF THE INVENTION

1. Field of the Invention

The present invention is related to controlling execution of computer systems and, more particularly, to general-purpose software for configuring and controlling execution of real-time data processing systems.

2. Description of the Related Art

Usually computers are controlled by sequential execution of instructions in a computer program. These programs are usually created by writing line after line of code (instructions in a computer language) and sometimes incorporating blocks of previously written code. In addition, entire programs, subprograms or modules which have previously been written may be executed by a single instruction in a new program. This type of sequential programming is still the most commonly practiced form of programming.

An alternative form of programming which has been increasingly used over the last decade is termed "object-oriented" programming. U.S. Pat. Nos. 4,827,404; 4,821,220 and 4,325,120 provide examples of methods which use object-oriented programming. In addition, U.S. Pat. No. 4,827,404 provides an extended description of object-oriented programming in general and is hereby incorporated by reference. Briefly summarizing the description of object-oriented programming in U.S. Pat. No. 4,827,404, the basic programming entity used in such programming is an "object" which contains both information and predetermined processes which are applied to the information. Typically, when such "objects" are used in programming, the objects are arranged in a hierarchy of classes. Rules for the creation of objects, such as inheritance of attributes within the hierarchy, are used to simplify the programming process.

Besides using of these forms of programming, other alternatives exist for controlling execution of computers. General purpose software has been developed which uses data supplied by a user to control the execution of the program. The data may be stored in a file prior to execution or input in response to a series of prompts or menus. When the data is stored in a file, the distinction between data controlling execution of a program and a programming language executed by a special purpose compiler is not always clear-cut. An example of a program which uses data stored in a file to control its execution is a "spreadsheet" program which combines data stored in various "cells" in a manner defined by data or instructions in other cells. Software, such as spreadsheets, with the flexibility to be applied to many different applications will be termed herein "general-purpose" software.

The term "real-time" is used to describe a type of processing performed by computers which involves collecting data at the time that the data is created, i.e., at substantially the same time that an event occurs which is of interest to the system. The event may be the arrival of material in a warehouse in the case of an inventory system, the beginning of a lunch break in a job costing system, detection of an alarm level in an industrial process monitoring system, etc. There is no known "general purpose" software which can be used to create a real-time data processing system. As a result, it has been necessary to create a unique program using either sequential programming or object-oriented programming for each real-time data processing system.

SUMMARY OF THE INVENTION

An object of the present invention is to provide a system for controlling execution of a real-time data processing system which does not require the creation of a unique program.

Another object of the present invention is to provide a standardized method for defining a variety of real-time data processing systems.

A further object of the present invention is to apply object-oriented concepts to data processed by a computer.

The above objects are attained by providing a method for controlling processing of real-time data obtained from at least one data source and processed in at least one computer system, comprising the steps of storing control data defining data record processing associated with the real-time data provided by each data source and processing the real-time data, obtained from the at least one data source, in the at least one computer system in dependence upon the control data. In the preferred embodiment, input screens are displayed requiring a user to configure storage and output formats, the at least one data source and the at least one computer system.

The control or configuration data classifies the input data to be obtained from each data source. When the input data is received, it is identified as a computer data object in accordance with the classification provided by the configuration data. The input data is then processed as part of the computer data object which includes the control data associated therewith by the identification process.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 4A is a table of transaction, record and field level processing according to the present invention;

FIG. 5 is a block diagram of transaction processing modules according to the present invention.

DESCRIPTION OF THE PREFERRED EMBODIMENTS

The present invention can be applied to many different types of computer processing. It is particularly useful in real-time processing applications and the detailed description will refer to this type of application. However, the present invention has wider applicability.

Figure 1A:
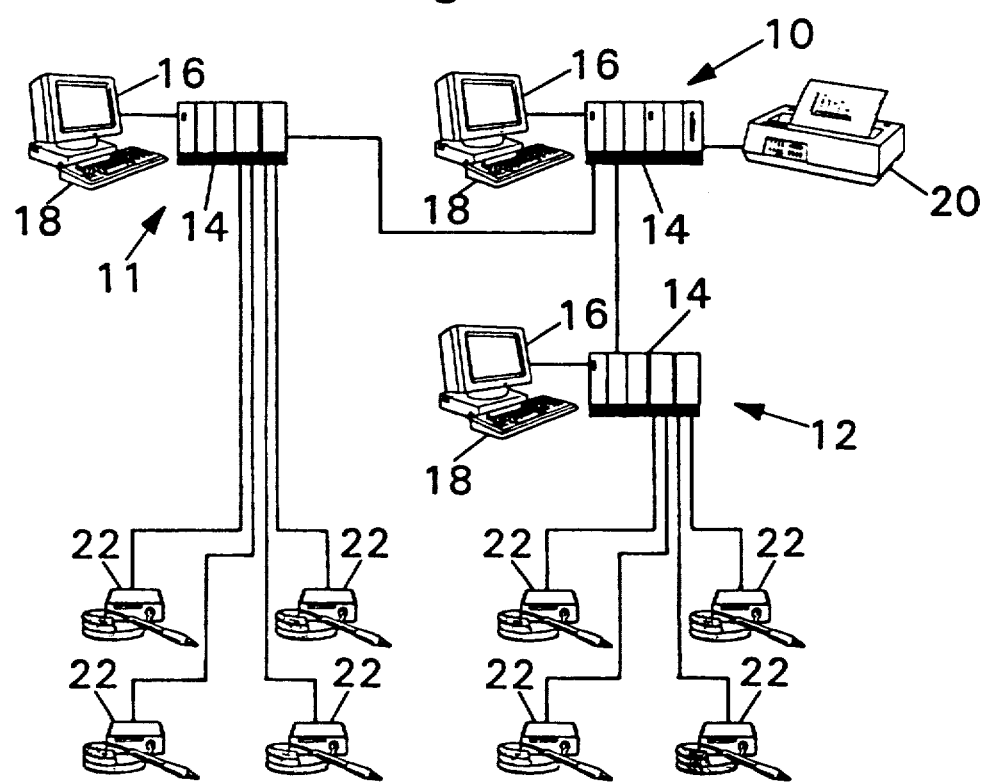
FIGS. 1A and 1B are block diagrams illustrating examples of physical configurations to which the present invention can be applied.

A block diagram of the physical configuration of interconnected computer systems is illustrated in FIG. 1A. The illustrated network includes a master computer system 10 and two satellite systems 11 and 12. Each of the systems 10-12 have a processor 14 including input/output interfaces, etc. In the embodiment illustrated in FIG. 1A, all of the computer systems 10-have a CRT 16 and keyboard 18, but this is not a requirement of the present invention. The master computer system 10 also has a printer 20 connected to the processor 14, while the satellite systems 11 and 12 each have four bar code readers. The bar code readers 22 are one example of data sources. Many other types of data sources may be used, such as magnetic card readers, any known device used for clocking in employees which has the capability of sending a data signal indicating the identity of the employee, sensors in a manufacturing plant providing data on the status of a process, etc. Of course, either the keyboard 18 or CRT 16 combined with a touch screen (not shown) could be used for inputting many forms of data. Similarly, other forms of data output devices, besides the CRTs 16 and printer 20 can be used, including magnetic tape drives, plotters, etc.

Figure 1B:
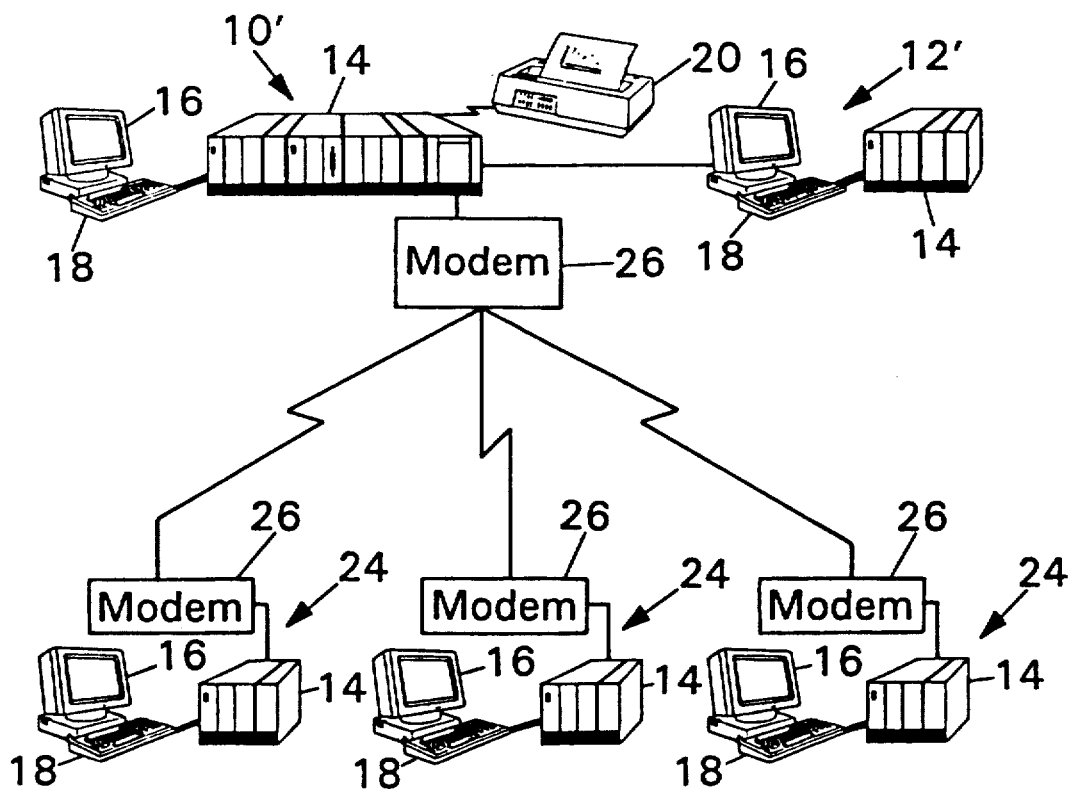

Furthermore, the present invention is not limited to operation on computer systems connected in a local area network. As illustrated in FIG. 1B, the master computer system 10' may be connected not only to a near-by computer system 12', but also to other computer systems 24 via modems 26. As a result, the computer systems 24 can be thousands of miles away with nearly instantaneous data availability on the master computer system 10'.

Figure 2A:
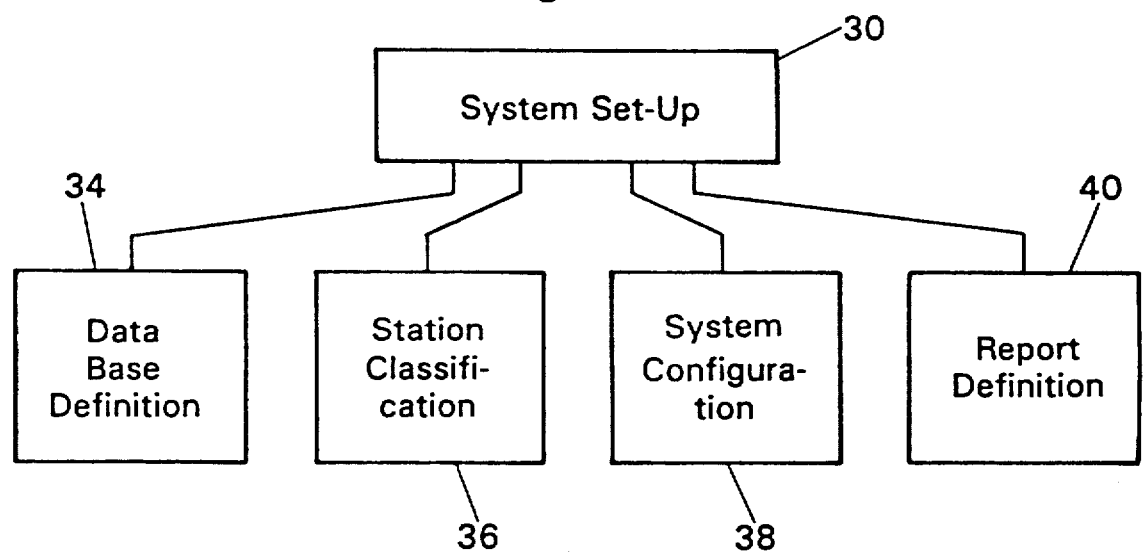
FIGS. 2A and 2B are block diagrams of the structure of software constructed according to the present invention.
Figure 2B:
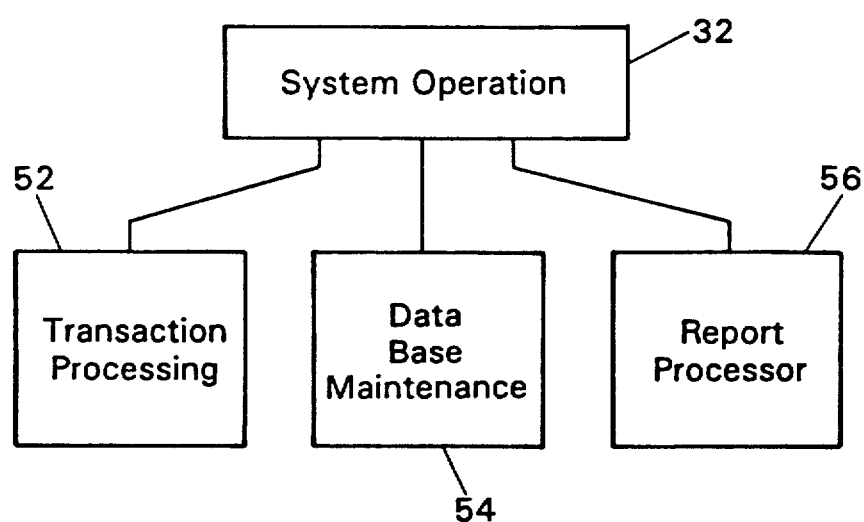

The present invention uses equipment in a configuration like that illustrated in FIG. 1A or FIG. 1B to perform data entry, validation and processing. According to the present invention a computer program is written, using any known technique, which has two major modules as illustrated in FIG. 2A and 2B. The first module used is a system set-up module 30 that creates control data defining data record processing associated with real-time data that will be processed by a system operation module 32. The system set-up module 30 include sub-modules for data base definition 34, station classification 36, system configuration 38 and report definition 40. The database definition sub-module 34 defines the storage format of stored data, while the report definition sub-module 40 defines the output format of the data. The report definition sub-module 40 may be used for defining the output format of not only printed reports, but also inquiries displayed on a CRT screen 16 or data output onto a magnetic tape, etc. The database and report definition sub-modules 34, 40 may use input screens displayed on the CRT 16 of one of the computer systems 10-12 in a manner similar to conventional programs which define databases and report generation. However, the manner in which the resulting configuration or control data is stored is significantly different from conventional programs, as will be described below in more detail.

The system configuration sub-module 38 is used to identify the data sources associated with each of the computer systems 10-12 and specify connections between each of the computer systems 10-12 and the data sources associated therewith. Preferably, all of the sub-modules 34, 36, 38, 40 display input screens prompting for input of the control data. As noted above, many different hardware arrangements can be used with the present invention. Therefore, the system configuration sub-module 38 displays input screens requiring the definition of the characteristics of the computer systems interconnected in the network on which the system operations module 32 will be run. In addition, the system configuration sub-module 38 identifies the data sources associated with each of the computer systems and specifies the connections between each of the computer systems and the data sources associated therewith. Thus, for the hardware arrangement illustrated in FIG. 1A, the system configuration sub-module 38 would be used to define a network containing a master computer system 10 connected to two satellite computer systems 11 and 12, each of which is connected to four bar code readers 22.

The station classification sub-module 36 is the most important sub-module in the system set-up module 30. This sub-module classifies the input data to be obtained from each data source. During execution of the system operation module 32, when the input data is received it is identified as a "computer data object" in accordance with the classification provided by the station classification sub-module 36. The term "computer data object" is used to refer to the particular form of object-oriented computer processing which is used in the present invention. Note that the term "object-oriented programming" is not used since the "computer data object" is not used to produce a conventional computer program as in the prior art, but rather to control execution of a general-purpose computer program represented in FIG. 2B by the system operation module 32. The only known example of "computer data objects" which are not used to produce computer programs is the manipulation of graphical elements as described in U.S. Pat. No. 4,827,404.

In the present invention, the "computer data object" includes a specific item of input data received from one of the data sources as well as the control data which determines how the input data will be processed. In the preferred embodiment, the input data is real-time data and this term will be used hereafter to clarify the distinction between control data which is input in the system set-up module 30 and the data which is input during execution of the system operation module 32. However, the present invention can be applied to situations where the data input in the system operation module 32 is not real-time data, but rather is previously recorded data.

To provide the necessary control data for proper processing of the real-time data which will be input during execution of the system operation module 32, the station classification sub-module 36 provides a great deal of information about data which will be input from each of the data sources. Included in the control data provided by the station classification sub-module 36 is a classification of the real-time data, provided by each of the data sources, according to transaction type. A single data source may be used for many different transaction types. For example, bar code readers 22 can be used for inputting any type of data contained in bar code format. Many types of bar code readers include keyboards and LED displays which provide communication between the user and the data input program. Thus, the type of transaction which will be input can be requested by the data input program and provided by means of either the keyboard of reading a bar code. For example, a user may carry a sheet with bar codes identifying different transaction types, or the transaction type may be part of the bar code identifying an item or a location on an assembly line.

The station classification sub-module 36 also is used in the preferred embodiment to input transaction, record and field control data defining different levels of processing of the real-time data. The transaction control data controls the transfer of data between the data source from which the real-time data is received and the computer system connected to the data source. The record control data defines the processing of entire records, while the field control data defines the processing of fields within records. The details of how the different types of control data affect processing of the real-time data will be described below in the description of the system operation module 32.

Figure 3:
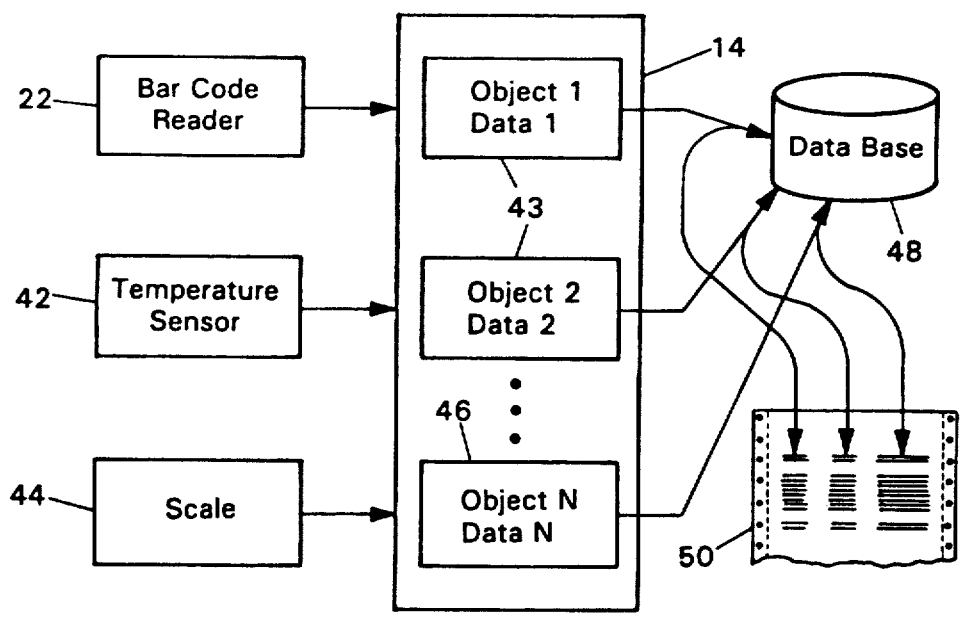
FIG. 3 is a block diagram of data flow in one application of the present invention.

An example of how real-time data becomes a "computer data object" during processing according to the present invention is illustrated in FIG. 3. The hardware used in the system depicted in FIG. 3 includes different types of data sources, a bar code reader 22, a temperature sensor 42 and a scale 44. A processor 14 obtains data from the data sources 22, 42, 44. As described above, the real-time data received from the data sources 22, 42, 44 is classified according to classifications previously input in the station classification sub-module 36 of the system set-up module 30. The control data defining the classification of each specific item of real-time data is associated with the items of real-time data to produce computer data objects 46. These objects are stored in a database 48 in accordance with the control data input in the database definition sub-module 34 and can subsequently be displayed on reports 50 in accordance with the control data input in the report definition sub-module 40.

The system operation module 32 illustrated in FIG. 2B includes three sub-modules. A transaction processing sub-module 52 uses the transaction, record and field control data in processing the real-time data. A database maintenance sub-module 54 is used for conventional database maintenance operations on the database 48 (FIG. 3). The report processor sub-module 56 uses the control data input in the report definition sub-module 40 to determine how the "computer data objects" provided by the transaction processing sub-module 52 are to be displayed. In addition to conventional reports and database inquiries, the reports processor sub-module 56 preferably includes the ability to display status reports describing the operation of the system operation module 32.

Figure 4B:
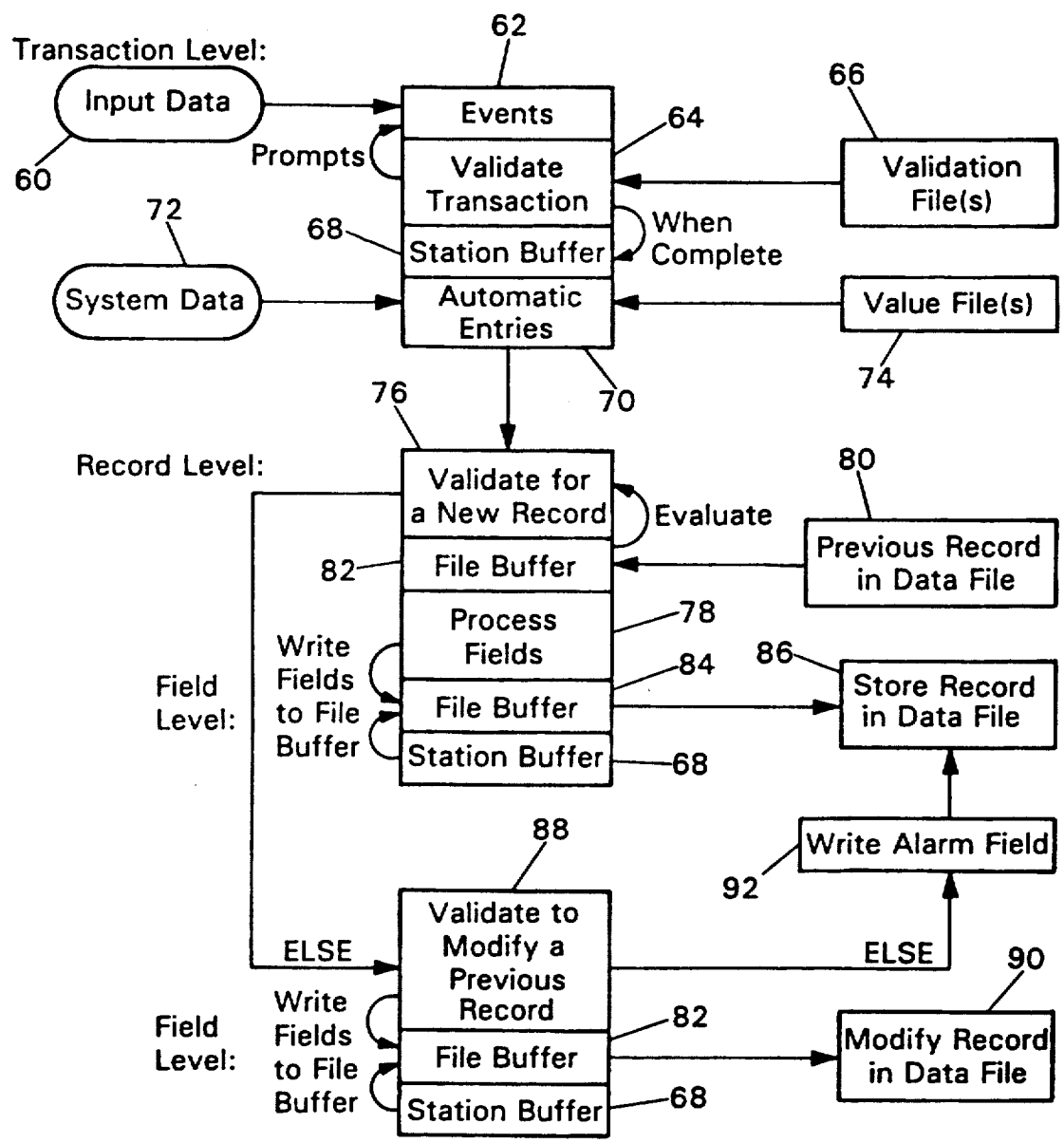
FIG. 4B is a processing flow diagram illustrating transaction, record and field level processing.

The type of operations performed by the transaction processing module 52 are indicated in tabular form in FIG. 4A and as a flow diagram in FIG. 4B. As noted above, the station classification sub-module 36 is used to input the transaction, record and field control data. As illustrated in FIG. 4A, the transaction control data determine the rules for creating and denying a transaction. In addition, transactions may be reset and terminated upon the occurrence of real-time data indicating that transaction level processing should be restarted or ended. The transaction reset can also be used to change from one transaction type to another.

With continuing reference to FIG. 4A, the record control data determines whether a validated transaction will create a new record or modify an existing record. Various conditions which can be applied to record level processing are indicated in FIG. 4A. Within a record, the field control data determines whether a field value is changed or not, based upon conditions which may be any of those indicated for creating a new record.

In addition, the field control data is used to define the extent and method of validation for the real-time data which is input. For example, input data may be compared with ranges, a list of valid values, etc. as is known in the art. Similarly, for devices such as bar code readers 22 with LED displays, prompts for input can be provided in the field or transaction control data. A transaction is formed of a sequence of the real-time data received from one data source which has been validated in field level processing.

The flow of processing executed in accordance with the control data is illustrated in FIG. 4B. Receipt of the real-time input data 60 is characterized by the transaction processing sub-module 52 as the occurrence of events 62. Transactions are validated 64 using validation files 66 and generate prompts for the input of more data 60 producing more events 62. A validated transaction is stored in a station buffer 68 and automatic entries 70 are made as required from system data 72, such as a time stamp or related data from previously stored value files 74.

A validated transaction undergoes record level processing to validate 76 new records. The validation of a new record includes field level processing 78 which as noted above may include the use of data in a previous record 80 as well as data from the station buffer 68. The field level processing 78 uses data stored in file buffers 82 and 84 corresponding to the previous record and recently received real-time data, respectively. When the new record has been validated, it is stored 86 in the database 48 (FIG. 3). If the record level processing indicates that a previous record is to be modified, field level processing 88 is performed for this purpose using data from the station buffer 68 and file buffer 82. If validated, the data in the file buffer 82 is stored in the database 48, thereby modifying 90 the record in the database. If the field level or record level processing invalidates the transaction, a flag is written 92 in the alarm field of the record and it is stored 86 in the database 48.

In the preferred embodiment, the transaction processing sub-module 52 includes separate processes for processing data obtained from the data sources. A line controller process 94 receives real-time data from the data sources, such as a bar code reader (BCR) 22 and scale 44 and stores the real-time data in a buffer pool 96. The real-time data is read from the buffer pool 96 by a session controller process 98 and stored in a station buffer 100. The session controller 98 essentially handles transaction level processing while passing the real-time data to a session process 102 via the station buffer 100. Thus, the session controller 98 stores prompts, defined by the field control data, in an output queue (QOut) in an order defined by the transaction control data and obtains the real-time data from the input queue (QIn) in the buffer pool 96, while the line controller 94 supplies the prompts to one of the data sources from the output queue (QOut) and supplies the real-time data from the data sources to the input queue (QIn).

The session process 102 performs the field and record level processing as described above. A log 104 may be produced or displayed to indicate status of the transaction processing sub-module 52.

Figure 6:
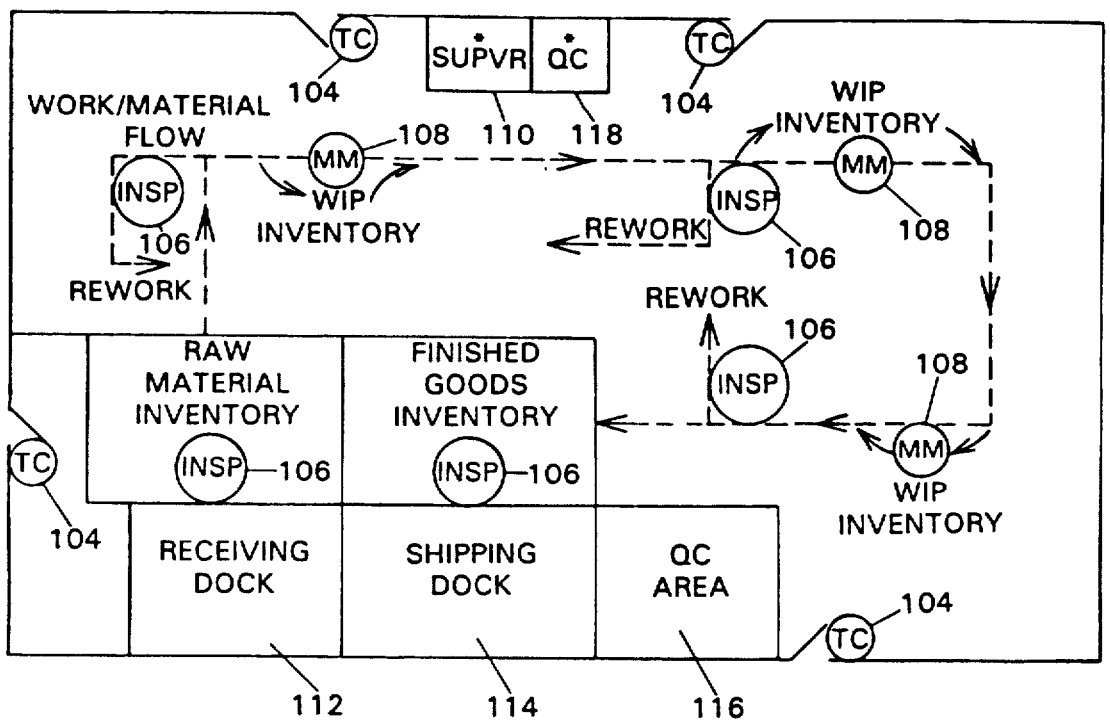
FIG. 6 is a block diagram of an application to which the present invention can be applied.

An example of an application of the present invention is illustrated in FIG. 6. In a manufacturing shop, time clocks (TC) 104 are distributed around the shop floor.

The time clocks 104 provide data sources for transactions on employee activity. Inspection stations (INSP) 106 and material movement stations (MM) 108 may be provided with bar code readers 22 so that a supervisor at a supervisor terminal (SUPVR) 110 can monitor the flow of work through the inspection 106 and material movement 108 stations. Additional bar code readers can be provided at the receiving and shipping docks 112, 114 to monitor the receipt of raw materials and shipment of finished products, respectively. In addition, both incoming and outgoing materials/products may be located in a quality control area 116 and their presence there can also be identified by the use of bar code readers 22. All of these areas may also be monitored at a quality control terminal (QC*) 118.

In the case of materials received without bar codes, a printer 20 (FIG. 1A) may be used to produce bar code labels at the receiving dock 112 so that materials can be identified as they are received. Thus, a single system can be used for raw and finished goods inventory, time keeping, quality control, job costing, etc. with real-time data collection and reports produced upon request.

Pseudo-code for a program capable of performing the preferred embodiment of the present invention is provided as an appendix. The pseudo-code corresponds to the block diagrams illustrated in FIGS. 2A, 2B and 5. Using the pseudo-code in the appendix and the description associated with these figures, an ordinary skilled programmer can produce a software product which defines, creates and processes "computer data objects" appropriate for many processing tasks.

Many of the features and advantages of the present invention are apparent from the detailed specification, and thus, it is intended by the appended claims to cover all such features and advantages which fall within the spirit and scope of the invention. Further, since numerous modifications and changes will readily occur to those skilled in the art, from the disclosure of the invention, it is not desired to limit the invention to the exact construction and operation illustrated and described. Accordingly, suitable modifications and equivalents may be resorted to, all falling within the scope and spirit of the invention.

What is claimed is:

1. A method for controlling processing of real-time data obtained from at least one data source and processed in at least one computer system, comprising the steps:
   (a) storing control data within the at least one computer system defining data record processing for the real-time data provided by a particular data source;
   (b) storing transaction control data within the at least one computer system for controlling the transfer of data between the at least one data source and the at least one computer system;
   (c) receiving real-time data from a particular data source by the at least one computer system;
   (d) identifying the particular data source from which the real-time data has been received by the at least one computer system;
   (e) identifying the control data which defines data record processing for the particular data source;
   (f) processing the real-time data receiving by the particular data source in accordance with the identified control data; and
   (g) validating the real-time data received from the particular data source to produce a monitoring transaction based on the control data.

2. A method as recited in claim 1 wherein said storing of the control data in step (a) further comprises the steps of:
   (a1) storing record control data defining the processing of entire data records; and
   (a2) storing field control data defining the processing of fields within data records.

3. A method as recited in claim 2 further comprising the step of:
   (h) determining whether the monitoring transaction requires the creation of a new data record or the modifying of an existing data record by comparing a field value of a field associated with the real-time data with a field value stored within the field control data.

4. A method as recited in claim 2, further comprising the steps of:
   (i) storing format control data defining storage and report formats; and
   (j) producing at least one report in at least one of the report formats during said processing in steps (f)–(h), upon receipt of a data base inquiry by the at least one computer system.

5. A method as recited in claim 4 further comprising the steps of:
   (k) receiving control input data from a user at an input screen;
   (l) processing the control input data by comparing the control input data to the stored data within the at least one data source contained within the at least one computer system; and
   (m) displaying the processed control input data in an output format which is data recognizable to the user.

6. A method as recited in claim 4, further comprising the step of (b1) inputting the transaction, record, field and format control data within the at least one computer system in response to prompts from the at least one computer system for the control data.

7. A method as recited in claim 6, wherein said inputting of control data to said at least one computer system in step (b1) and said storing in steps (a) and (i) are performed prior to said processing in steps (f)–(h).

8. A method as recited in claim 6, wherein step (f) further comprises the steps of:
   (f1) storing prompts defined by the field control data in an output queue associated with the at least one computer system in an order defined by the transaction control data;
   (f2) supplying the prompts to the at least one data source from the output queue and supplying the real-time data from the at least one data source to an input queue associated with the at least one computer system; and
   (f3) obtaining the real-time data from the input queue for use in steps (g)–(h).

9. A method as recited in claim 8, wherein the at least one data source includes a plurality of data sources and the at least one computer system includes a plurality of computer systems interconnection in a network,
   wherein said storing of the control data in step (a) further comprises the step of:
   (a3) specifying connections between each of the computer systems and the data sources associated therewith.

10. A method as recited in claim 9, wherein said storing of the control data in step (a) further comprises the step of (a4) classifying the real-time data provided by each of the data sources according to transaction type.

* * * * *